United States Patent Office 3,532,651
Patented Oct. 6, 1970

3,532,651
4,4′-METHYLENE-BIS(CYCLOHEXYLISOCYA-NATE)MODIFIED ALKYD RESINS
George S. Wooster, Hamburg, N.Y., assignor to Allied Chemical Corporation, New York, N.Y., a corporation of New York
No Drawing. Filed June 28, 1968, Ser. No. 741,199
The portion of the term of the patent subsequent to July 29, 1986, has been disclaimed
Int. Cl. C08g 17/16, 22/06; C09d 3/72
U.S. Cl. 260—22
14 Claims

ABSTRACT OF THE DISCLOSURE

Production of isocyanate modified alkyd resin coating compositions comprising, as the major film-forming component, the reaction product of an alkyd resin containing free hydroxyl groups derived from the condensation of a polybasic acid or anhydride with a drying oil glyceride containing free hydroxyl groups and 4,4′-methylene-bis (cyclohexylisocyanate), the proportions of said alkyd resin and said isocyanate being such as to provide an isocyanate to hydroxyl group ratio in the range between about 0.3 and 0.75. The coating compositions exhibit excellent color stability and gloss retention, acceptable mechanical properties, e.g. hardness, and exhibit improved viscosity characteristics and desirable tack-free drying times.

---

This invention relates to isocyanate modified alkyd resin coating compositions. More particularly, it relates to coating compositions of the "one-package" type prepared by the reaction of a fatty-acid containing alkyd resin and a minor proportion of 4,4′-methylene-bis(cyclohexylisocyanate).

The improvement in general film properties of alkyd resins by modification of the alkyd with organic polyisocyanates has been long known in the art (U.S. Pat. 2,282,827). The decrease in drying time of these isocyanate modified alkyd resin films is so great that in the case of the oil modified alkyd resins, depending on the nature and the amount of polyisocyanate used and the type of oil present, gelation of the solution often occurs before a film can be established. Customarily, the amount of organic polyisocyanate employed in prior art methods of polyisocyanate modification of alkyd resins is such that the NCO groups are substantially equivalent to the free hydroxyl groups present in the alkyd resin; use of such proportions in many instances results in poor solubility and gelation. Moreover, many of the clear coatings produced from the isocyanate modified alkyd resins are sensitive to sunlight and ultraviolet light, exhibiting a pronounced ambering after prolonged exposure, which may be attributable to the nature of the polyisocyanate employed in production of the isocyanate modified alkyd resin.

Accordingly, it is a primary object of the present invention to provide isocyanate modified alkyd resin coating compositions having improved viscosity characteristics and desirable tack-free drying times.

Another object of the present invention is to provide coating compositions which exhibit improved exterior durability, i.e. which are characterized by improved color stability and gloss retention.

The coating compositions of the present invention comprise, as the major film-forming component, the reaction product of (1) an alkyd resin containing free hydroxyl groups derived from the condensation of a polybasic acid or anhydride with a drying oil glyceride containing free hydroxyl groups, and (2) 4,4′-methylene-bis(cyclohexylisocyanate); the proportions of said alkyd resin and isocyanate being sufficient to provide an isocyanate to hydroxyl group ratio, hereinafter referred to as the NCO/OH ratio, in the range of between about 0.3 and 0.75, preferably, between about 0.45 and 0.65, said film-forming component having a total fatty-acid content of between about 25 and 70 percent by weight. When the NCO/OH ratio falls below about 0.3, poor film properties, e.g. hardness and gloss, are encountered. At NCO/OH ratios higher than about 0.75, gelation normally occurs.

The drying oil glyceride is preferably prepared by an ester interchange reaction of a low molecular weight polyol having an average of more than 2 hydroxyl groups per molecule with a drying oil. Drying oils are well known in the art as raw material sources for long chain unsaturated fatty-acids which are used in preparation with the drying oil glyceride employed in the present invention. Representative drying oils suitable herein include:

Linseed oil          Poppyseed oil
Soybean oil          Olive oil
Cottonseed oil       Tall oil
Tung oil             Fish oil
Peanut oil           Dehydrated castor oil
Sunflower oil        Rapeseed oil
Perilla oil          Safflower oil
Oiticica oil The present invention contemplates the use of such oils which have been modified by the well known processes of "bodying" or blowing as well as mixtures of such oils. Particularly useful are the more readily available soybean, linseed and dehydrated castor oils. Alternatively, a suitable glyceride can be prepared by esterification of the low molecular weight polyol with one or more fatty-acids having a high degree of unsaturation. It is preferred that the fatty-acid component include at least about 70 percent, by weight, of unsaturated fatty acid.

Low molecular weight polyols which may be employed in the preparation of the drying oil glyceride include triols, tetrols, pentols and the like and mixtures thereof, as well as mixtures of such polyols with diols. The polyol or polyol mixtures should have an average of more than 2, generally, not more than 6, and preferably, between about 2.2 and 3.5, hydroxyl groups per molecule and have an average equivalent weight of between about 25 and 100, preferably between about 30 and 50. Typical polyols include, for example, glycerine, hexane triol, trimethylolethane, trimethylolpropane, trimethylolbutane, pentaerythritol and the like and mixtures thereof, and mixtures with diols such as ethylene glycol, diethylene glycol, propylene glycol, dipropylene glycol, hexane diol and the like.

When preparing the drying oil glyceride by transesterification, the reaction is normally conducted by heating the polyol-drying oil mixture in an inert atmosphere at elevated temperature, for example, 200–250° C. with agitation for a suitable period, for example, 1–5 hours and, if desired, in the presence of a transesterification catalyst such as an alkali metal or alkaline earth metal salt of the carboxylic acid, for example, calcium naphthenate or lithium naphthenate, litharge, metal oxide such as zinc oxide, caustic soda or the like. Direct esterification of the polyol with the fatty-acid having a high degree of unsaturation may be effected by heating a mixture of the polyol and unsaturated fatty-acid in an inert atmosphere at an elevated temperature, for example, about 150–200° C. while removal of water esterification by azeotropic distillation, as is conventionally effected in this art. Upon completion of the transesterification or direct esterification reaction, the resultant product is cooled, for example, to about 50° C.

In the preparation of the alkyd resin, the free hydroxyl groups of the drying oil glyceride are partially esterified by reaction with an organic polybasic acid or anhydride such as phthalic, isophthalic, terephthalic, maleic, fumaric, succinic and the like or mixtures thereof, phthalic being preferred. The polymerization reaction effected in preparation of the alkyd resin is conducted at conventional elevated temperatures, for example, about 200° C. in the presence of a solvent under azeotropic reflux conditions for removal of water of esterification.

It is general practice to use inert solvents both to provide a stirrable reaction medium and to provide a flowable coating composition. In the present invention it is convenient and hence preferred to utilize a solvent which is adequate for both purposes. Hence, the solvents used in this invention are similar to the conventional varnish solvents. Typical of such solvents are:

Toluene
Xylene
Low boiling petroleum hydrocarbon distillate fractions
Toluene-methylene chloride mixtures
Isopropyl ether
Esters, such as ethyl acetate
Ketones, such as methyl ethyl ketone, cyclohexanone In general, the solvent employed is substantially free of active hydrogen containing groups, as determined by the well known Zeravitnoff Test (c.f. Kohler et al., J.A.C.S. 40, 3181–8 (1927)).

The alkyd resin produced in the above-described polymerization reaction is cooled to a temperature below about 70° C. and a suitable catalyst is added thereto prior to addition of the 4,4′-methylene-bis(cyclohexylisocyanate). Suitable catalysts for modification of the alkyd resin with said polyisocyanate are organo tin salt catalysts as described, for example, in U.S. Pat. 3,224,988, issued Dec. 21, 1965, the disclosure of which is incorporated herein by reference. The catalyst is added followed by the gradual addition of the polyisocyanate component, said addition being generally effected at a temperature between about 50–75° C. Usually, the exothermic heat of reaction suffices to provide a reaction temperature and, in fact, external cooling may sometimes be necessary. Partial control of this temperature may be obtained by adjusting the rate of addition of the polyisocyanate and/or addition of solvent during this stage.

As indicated above, the resultant hydroxyl containing alkyd resin is reacted with 4,4′-methylene-bis(cyclohexylisocyanate) in an amount sufficient to provide an NCO/OH ratio of between about 0.3 and 0.75. Any of the 3 stereoisomers of methylene-bis(cyclohexylisocyanate), namely, the cis-cis, cis-trans or trans-trans, isomers or mixtures thereof may be employed. Preferably, for optimum solubility characteristics, the methylene-bis(cyclohexylisocyanate) contains between about 40–80 percent, by weight, of trans-containing isomers. During the addition of the polyisocyanate component, the reaction mixture is agitated and, if desired, the mass thickness and fluidity may be maintained by the addition of solvent, as and if necessary. When the reaction between the polyisocyanate component and the hydroxyl containing alkyd resin is substantially complete, the remaining solvent required by the formulation is added and the batch is agitated until the desired viscosity is obtained.

If desired, "driers" used to catalyze and otherwise accelerate the film-forming reaction may be included in the coating compositions of the present invention. The "driers" used are the same as those used in the more conventional varnish formulations. Typically, the naphthenates or equivalent oil-soluble salts of cobalt, lead or manganese, are used and are particularly suitable in these coatings. These driers may be conveniently added to the batch as solutions in mineral spirits, after all the solvent required by the formulation has been added.

The coating compositions of the present invention may be further characterized in terms of weight percent of reactants of the major film-forming component as follows:

| | Range in weight percent |
|---|---|
| Fatty-acid (containing at least 70 percent by weight of unsaturated fatty-acid) | 25 to 70 |
| Polybasic acid | 5 to 30 |
| Polyol | 16 to 33 |
| Methylene-bis(cyclohexylisocyanate) | 5 to 30 |

The coating compositions of the present invention can be stored indefinitely without deterioration due to "gelling," when stored in an inert atmosphere, i.e. an atmosphere free of oxidizing gases. These coating compositions can be conveniently applied as a solution in an inert solvent, above described, preferably in concentrations containing between about 25 and 75 percent by weight of film-forming component. Any of the well known conventional methods of application, such as brushing, rolling, dipping, spraying and the like may be employed.

To further illustrate the present invention and the manner in which it may be practiced, the following specific examples are set forth. In the examples, unless otherwise indicated, all parts are by weight and all temperatures are in Centigrade degrees.

EXAMPLE 1

A coating composition comprising, in weight percent of reactants, exclusive of solvent:

| | Percent |
|---|---|
| Soybean oil | 50.0 |
| Trimethylolethane | 18.4 |
| Phthalic anhydride | 16.8 |
| 4,4′-methylene-bis(cyclohexylisocyanate) | [1] 14.8 |

[1] 75% trans/25% cis-isomer and having an NCO/OH ratio of 0.5, was prepared as follows.

A mixture of 878 parts of soybean oil, 322 parts of trimethylolethane and 6 parts of lithium naphthenate was heated with agitation at 225 to 230 degrees, in an atmosphere of nitrogen for about 2 hours and then cooled to room temperature. A 300 part portion of the reaction product was combined with 74 parts of phthalic anhydride in the presence of 86 parts of xylene. The mixture was heated at 230–235 degrees for about 1½ hours, then cooled to about 70 degrees. A total of 131 parts of a 50 percent solution of 4,4′-methylene-bis(cyclohexylisocyanate) in xylene was added together with ¼ part of dibutyltin dilaurate over a ½ hour period and the mixture was maintained at 70–75 degrees for 2 hours, at 100 degrees for an additional hour and then cooled to room temperature. Xylene was added in an amount sufficient to adjust the solvent content to 45 percent. About 0.05 percent of cobalt and about .5 percent of lead, based on the total of non-volatiles were added to the solution as naphthenates.

For test purposes, the coating composition was applied to a glass plate as a 3 mil thick wet coating, using a Bird film applicator (drawdown blade). The 55 percent coating solution had a Gardner-Holdt viscosity of G–H, a tack-free time of 4 to 5 hours, and a Sward hardness of 13 (after 4 days). The coating also exhibited excellent resistance to discoloration and gloss retention on weathering.

EXAMPLE 2

A coating composition comprising, in weight percent of reactants, exclusive of solvent:

| | Percent |
|---|---|
| Soybean oil | 48.5 |
| Trimethylolethane | 17.9 |
| Phthalic anhydride | 16.3 |
| 4,4′-methylene-bis(cyclohexylisocyanate) | [1] 17.3 |

[1] 75% trans/25% cis-isomer and having an NCO/OH ratio of 0.6, was prepared as follows.

The procedure of Example 1 was repeated except that the amounts of reactants were varied as follows. A 200 part portion of the transesterified product of soybean oil and trimethylolethane was reacted with 49 parts of phthalic anhydride. This reaction product was reacted with 104 parts of a 50 percent solution of 4,4'-methylene-bis-(cyclohexylisocyanate) in xylene with 0.175 part of dibutyltin dilaurate present.

The coating composition, after dilution with xylene to a solution of 55 percent non-volatiles, had a Gardner-Holdt viscosity of S. A film applied, as in Example 1, had a tack-free time of 2 hours and a Sward Rocker hardness of 24 (after 4 days). Sward Rocker hardness testing is described in 'Physical and Chemical Examination of Paints, Varnishes, Lacquers and Colors," Gardner and Sward, 11th edition (1950), pages 164–166. The coating also exhibited excellent resistance to discoloration and gloss retention on weathering.

I claim:

1. A storage stable coating composition characterized by excellent color stability and gloss retention comprising, as the major film-forming component, the reaction product of (1) an alkyd resin containing free hydroxyl groups derived from condensation of a polybasic acid or anhydride with a drying oil glyceride containing free hydroxyl groups and (2) 4,4'-methylene-bis(cyclohexylisocyanate), the proportions of said alkyd resin and said isocyanate being such as to provide an isocyanate to hydroxyl group ratio in the range between about 0.3 and 0.75, said film-forming component having a total fatty-acid content of between about 25 and 70 percent, by weight.

2. The composition as defined in claim 1 dissolved in an inert organic solvent.

3. The composition as defined in claim 2 wherein the total fatty-acid content of said film-forming component is comprised of at least 70 percent, by weight, of unsaturated fatty-acids.

4. The composition as defined in claim 2 wherein said 4,4'-methylene-bis(cyclohexylisocyanate) is present in an amount between 5 to 30 percent, by weight, of said film-forming component.

5. The composition as defined in claim 2 wherein said drying oil glyceride is obtained by reaction of a polyol having an average of more than 2 hydroxyl groups per molecule and an equivalent weight between about 25 and 100 with a drying oil.

6. The composition as defined in claim 5 wherein said polyol has an average of between about 2.2 and 3.5 hydroxyl groups per molecule and an average equivalent weight between about 30 and 100, and said drying oil is a member selected from the group consisting of soybean oil, linseed oil and dehydrated castor oil and said isocyanate contains between about 40–80%, by weight, of trans-containing isomers.

7. The composition as defined in claim 6 wherein the proportions of said alkyd resin and said isocyanate are such as to provide an isocyanate to hydroxyl group ratio between about 0.45 and 0.65.

8. In a method of producing ungelled storage stable isocyanate modified alkyd resin coating compositions comprising, as the major film-forming component, the reaction product of an alkyd resin and an organic isocyanate, the improvement which comprises effecting said method at a temperature between about 50–75° C. while employing (1) as said alkyd resin, an alkyd resin derived from condensation of a polybasic acid or anhydride with a drying oil glyceride containing free hydroxyl groups, and (2) as said organic isocyanate, 4,4'-methylene-bis-(cyclohexylisocyanate) in amount such as to provide an isocyanate to hydroxyl group ratio in the range between about 0.3 and 0.75.

9. The process as defined in claim 8 wherein the total fatty-acid content of said film-forming component is between about 25 to 70 percent, by weight, of said film-forming component.

10. The process as defined in claim 9 wherein at least 70 percent, by weight, of said fatty-acids are unsaturated fatty-acids.

11. The process as defined in claim 9 wherein said 4,4'-methylene-bis(cyclohexylisocyanate) is present in an amount between 5 to 30 percent, by weight, of said film-forming component.

12. The process as defined in claim 9 wherein said drying oil glyceride is obtained by reaction of a polyol having an average of more than 2 hydroxyl groups per molecule and an equivalent weight between about 25 and 100 with a drying oil.

13. The process as defined in claim 12 wherein said polyol has an average of between about 2.2 and 3.5 hydroxyl groups per molecule and an average equivalent weight between about 30 and 50, and said drying oil is a member selected from the group consisting of soybean oil, linseed oil and dehydrated castor oil and said isocyanate contains between about 40–80%, by weight, of trans-containing isomers.

14. The process as defined in claim 13 wherein the proportions of said alkyd resin and said isocyanate are such as to provide an isocyanate to hydroxyl group ratio between about 0.45 and 0.65.

References Cited

UNITED STATES PATENTS

| 2,970,123 | 1/1961 | Rhodes et al. | 260—22 |
| 2,981,712 | 4/1961 | Harper | 260—22 |
| 3,224,988 | 12/1965 | Skreckoski | 260—22 |
| 3,318,828 | 5/1967 | Seiner | 260—22 |
| 3,346,524 | 10/1967 | Skreckoski | 260—22 |
| 3,349,049 | 10/1967 | Seiwert et al. | 260—22 |
| 3,458,459 | 7/1969 | Wooster | 260—21 |

FOREIGN PATENTS 729,741 3/1966 Canada.

DONALD E. CZAJA, Primary Examiner

R. W. GRIFFIN, Assistant Examiner

U.S. Cl. X.R.

117—124, 167; 260—31.2, 32.8, 33.2, 33.6, 33.8